(12) United States Patent
Switzer

(10) Patent No.: US 11,383,788 B1
(45) Date of Patent: Jul. 12, 2022

(54) ADJUSTABLE HANDLEBAR ASSEMBLY

(71) Applicant: Torie Switzer, W Terre Haute, IN (US)

(72) Inventor: Torie Switzer, W Terre Haute, IN (US)

( * ) Notice: Subject to any disclaimer, the term of this patent is extended or adjusted under 35 U.S.C. 154(b) by 0 days.

(21) Appl. No.: 17/388,500

(22) Filed: Jul. 29, 2021

(51) Int. Cl.
   *B62K 21/16* (2006.01)
   *B62K 21/26* (2006.01)

(52) U.S. Cl.
   CPC ............ *B62K 21/16* (2013.01); *B62K 21/26* (2013.01)

(58) Field of Classification Search
   None
   See application file for complete search history.

(56) References Cited

U.S. PATENT DOCUMENTS

| | | | |
|---|---|---|---|
| 1,448,921 A * | 3/1923 | Ershkowitz | B62K 21/125 |
| 2,059,669 A | 11/1936 | Skoog | |
| D263,293 S | 3/1982 | Janson | |
| 5,083,476 A | 1/1992 | Borromeo | |
| 5,195,394 A | 3/1993 | Latta | |
| 6,374,697 B1 | 4/2002 | Brandl | |
| 2005/0183536 A1 | 8/2005 | Okada | |

FOREIGN PATENT DOCUMENTS

| | | | |
|---|---|---|---|
| CN | 109178169 | * 10/2018 | ............ B62K 21/16 |
| EP | 1566329 | 3/2008 | |

* cited by examiner

*Primary Examiner* — Vicky A Johnson

(57) ABSTRACT

An adjustable handlebar assembly for fitting a bicycle to a user having disparate arm reaches includes a handlebar, which comprises left and right sections. A lower end of the left section and a bottom end of the right section are rotatably engaged and define a midpoint of the handlebar. The handlebar is mountable by its midpoint to a handlebar stem of a bicycle. Left and right grips of the handlebar are independently positionable relative to a rotatable plane, which is perpendicular to a front wheel of the bicycle and which extends longitudinally through the handlebar stem. The left and right sections are fixedly engageable so that the left and right grips are fixed relative to the rotatable plane. The left and right sections being selectively positionable allows them to be engaged by left and right hands, respectively, of a user having a reach disparity between their arms.

8 Claims, 8 Drawing Sheets

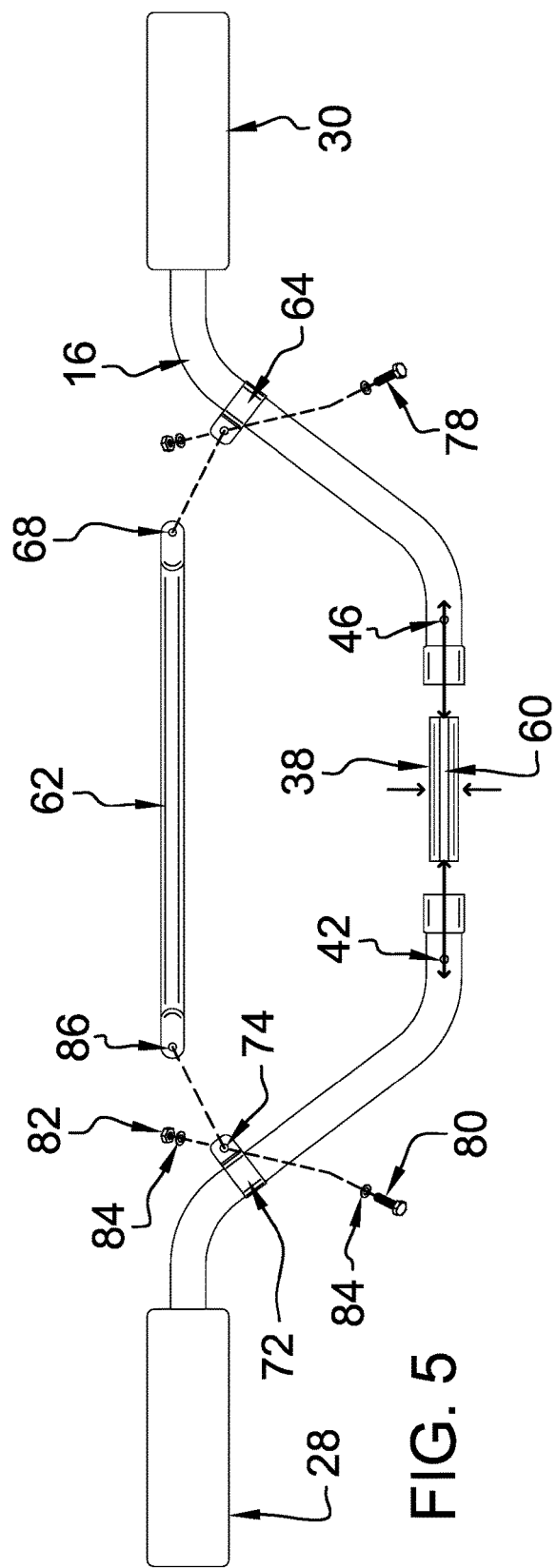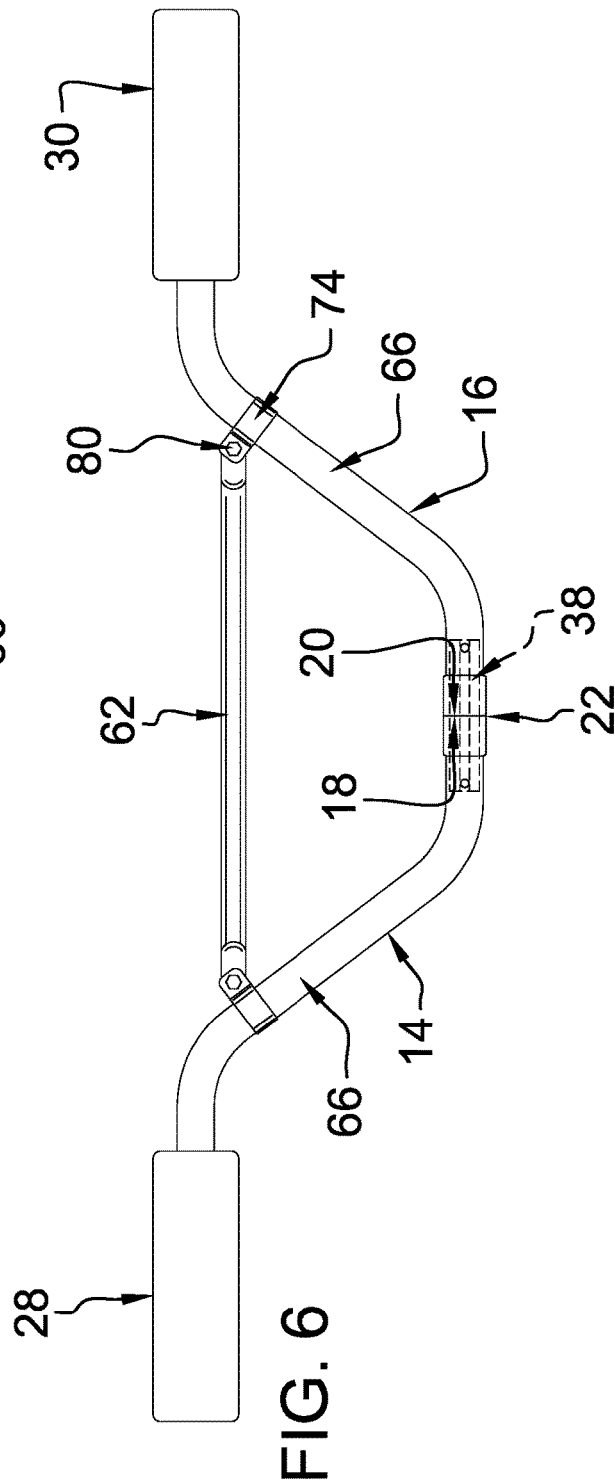

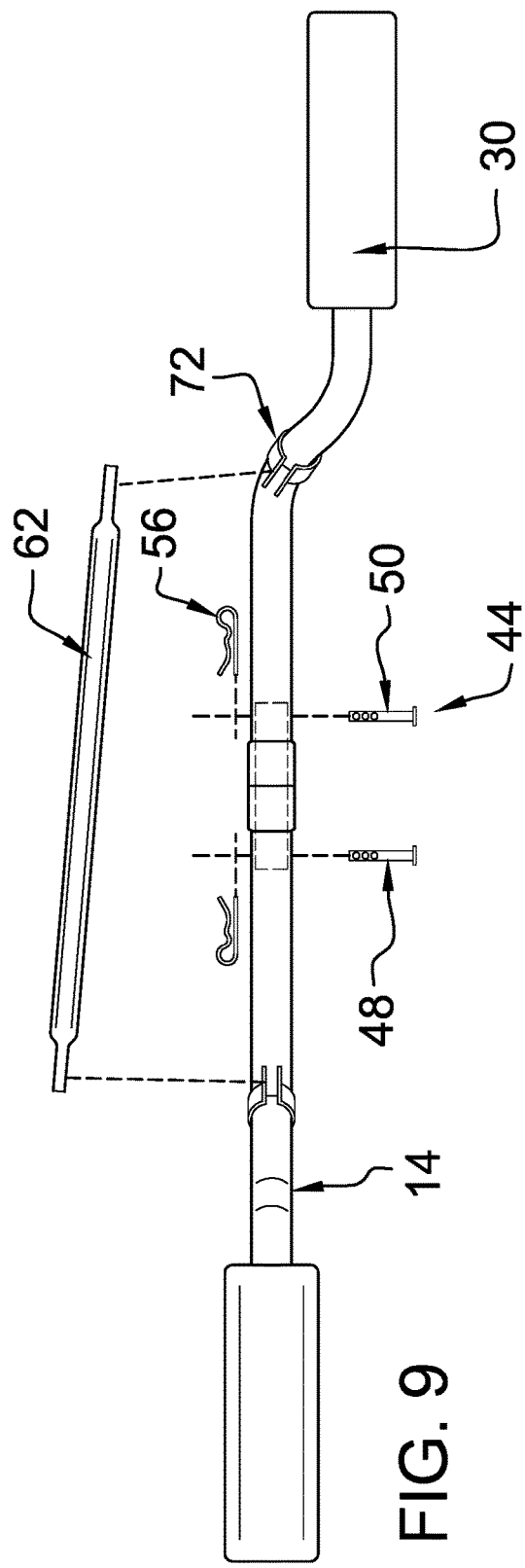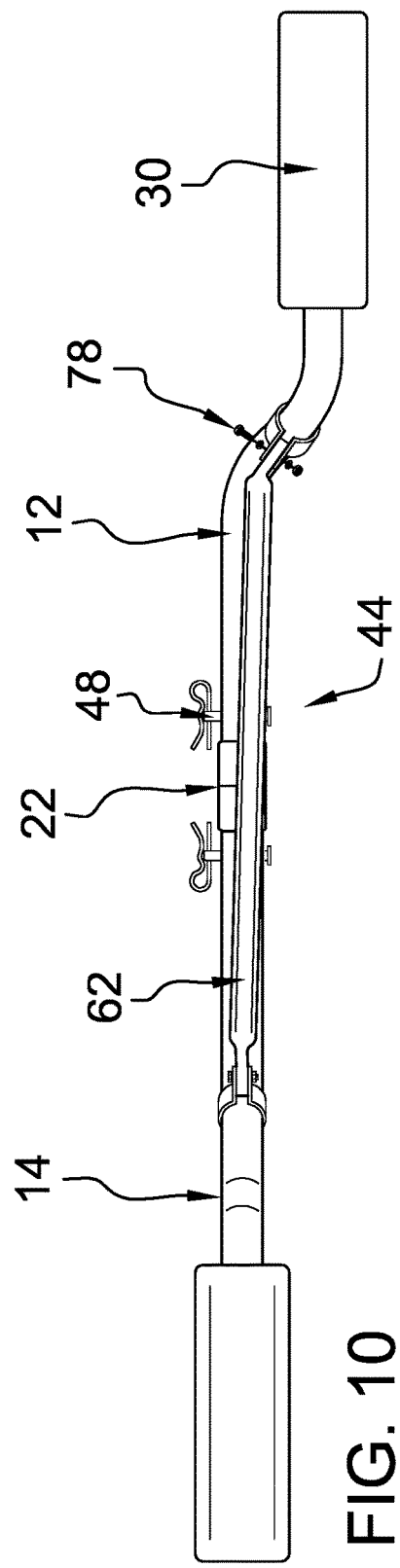

ADJUSTABLE HANDLEBAR ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to handlebar assemblies and more particularly pertains to a new handlebar assembly for fitting a bicycle to a user having disparate arm reaches. The present invention discloses a handlebar assembly comprising a handlebar comprising a left section that is rotatably and selectively fixedly engageable to a right section, thus allowing selective positioning of left and right handgrips relative to a rotatable plane perpendicular to a front wheel of a bicycle.

(2) Description of Related Art Including Information Disclosed Under 37 CFR 1.97 and 1.98

The prior art relates to handlebar assemblies. Prior art handlebar assemblies have a variety of shapes and configuration, but the prior art lacks a handlebar assembly allowing selective positioning of left and right handgrips relative to a rotatable plane perpendicular to a front wheel of a bicycle.

BRIEF SUMMARY OF THE INVENTION

An embodiment of the disclosure meets the needs presented above by generally comprising a handlebar, which comprises a left section and a right section. A lower end of the left section and a bottom end of the right section are rotatably engaged and define a midpoint of the handlebar. The handlebar is configured to be mountable to a handlebar stem of a bicycle so that the handlebar is engaged to the handlebar stem at the midpoint. A left grip and a right grip of the handlebar are independently positionable relative to a rotatable plane, which is perpendicular to a front wheel of the bicycle and which extends longitudinally through the handlebar stem. The left section and the right section are selectively fixedly engageable so that the left grip and the right grip are fixedly positioned relative to the rotatable plane. The left section and the right section are configured to be selectively positioned relative to the rotatable plane so that the left grip and the right grip are positioned to be engaged by a left hand and a right hand, respectively, of a user having a reach disparity between their arms.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 5 is an exploded view of an embodiment of the disclosure. exploded

FIG. 6 is a front view of an embodiment of the disclosure.

FIG. 9 is a top view of an embodiment of the disclosure.

FIG. 10 is a top view of an embodiment of the disclosure.

DETAILED DESCRIPTION OF THE INVENTION

Figure 1:
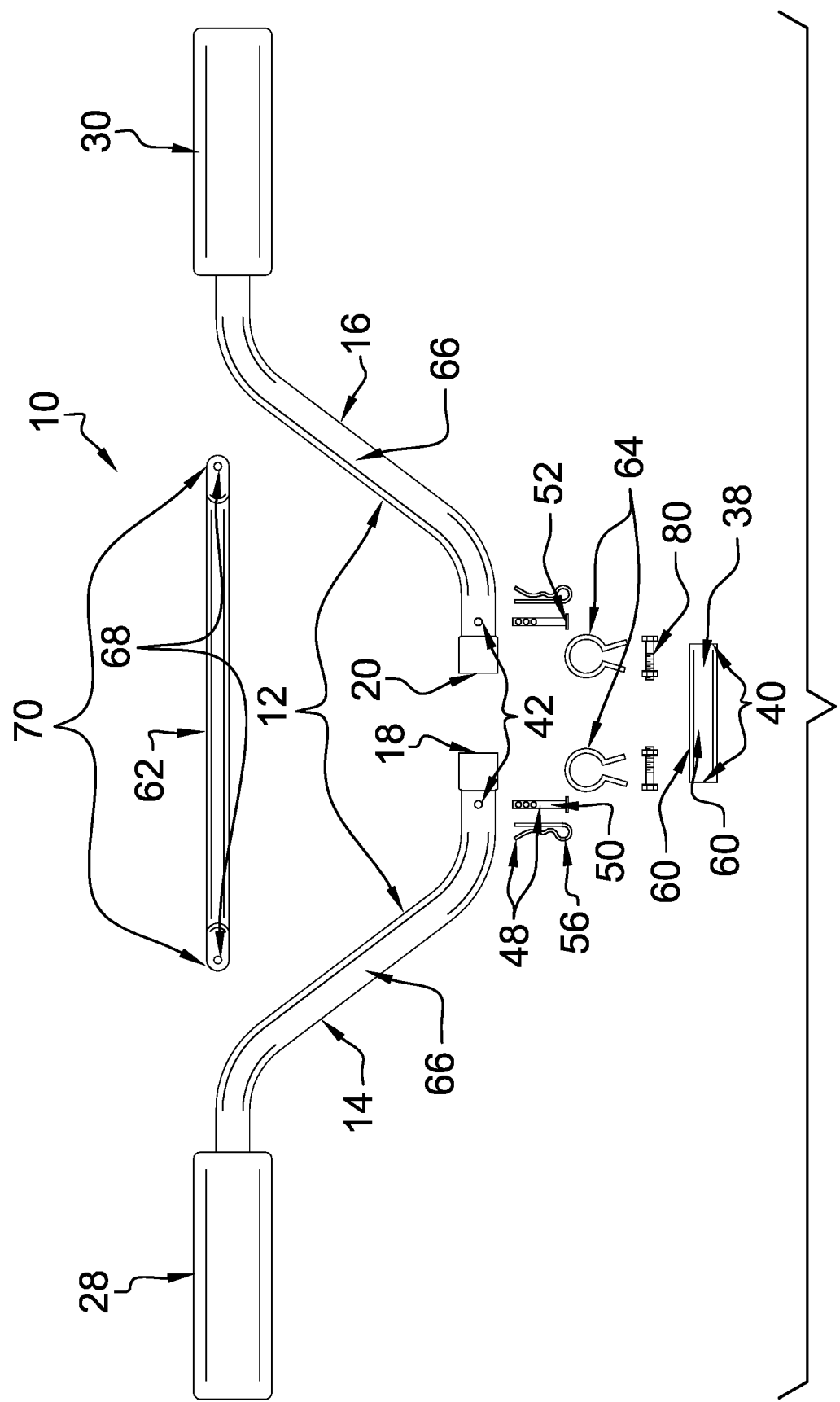
FIG. 1 is a front exploded view of an adjustable handlebar assembly according to an embodiment of the disclosure.
Figure 2:
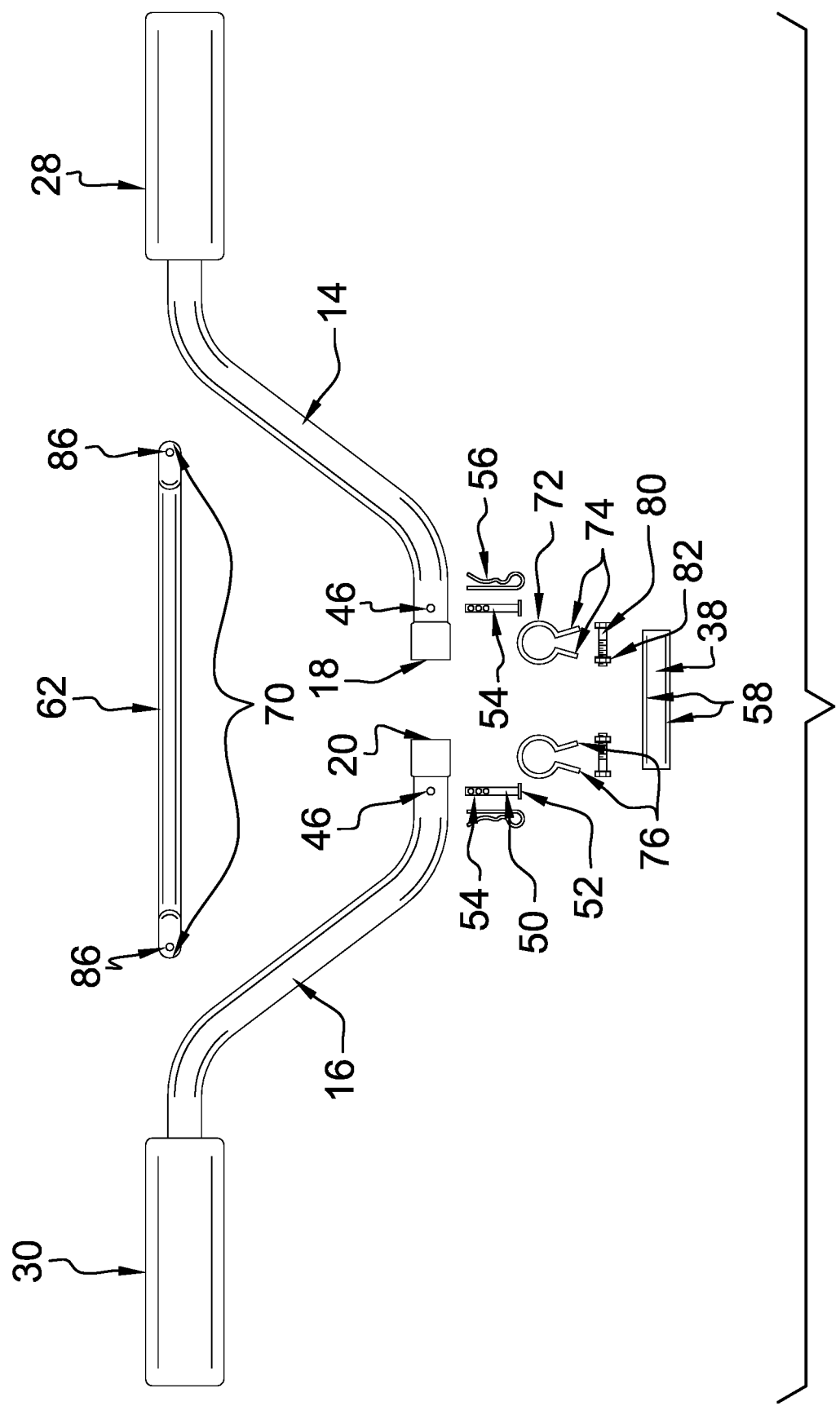
FIG. 2 is a rear exploded of an embodiment of the disclosure.
Figure 3:
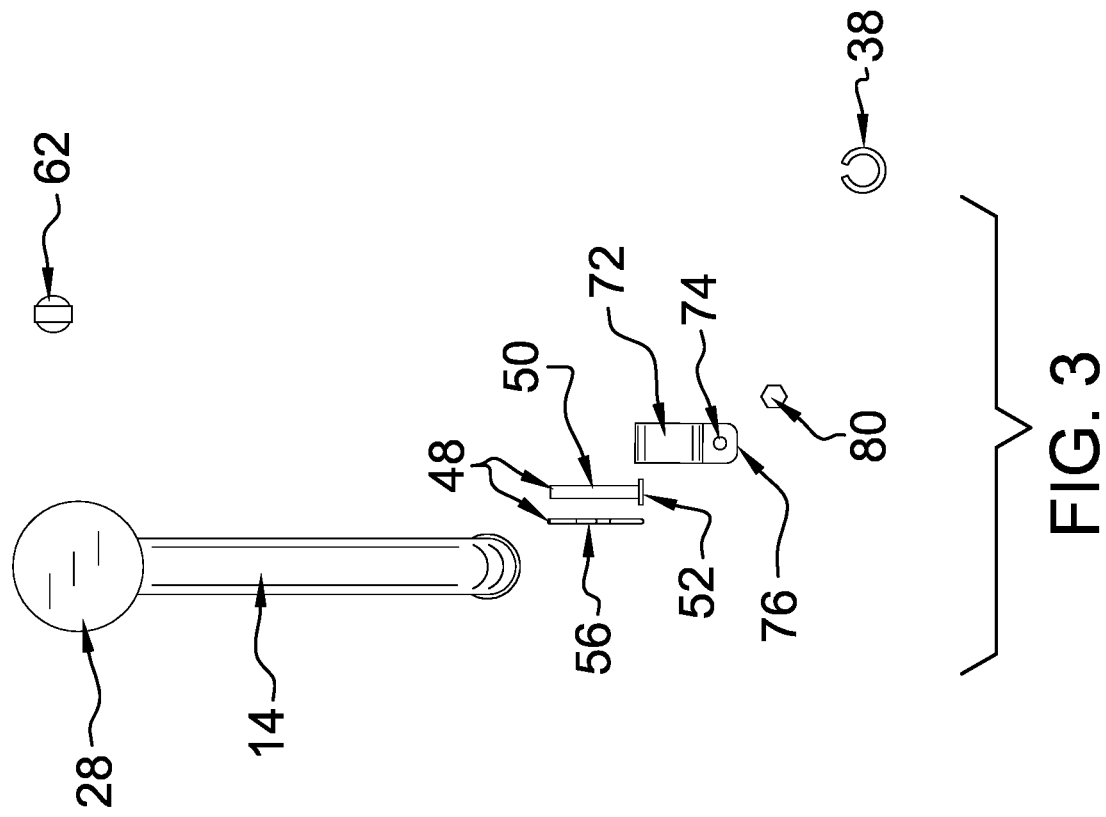
FIG. 3 is a side exploded view of an embodiment of the disclosure.
Figure 4:
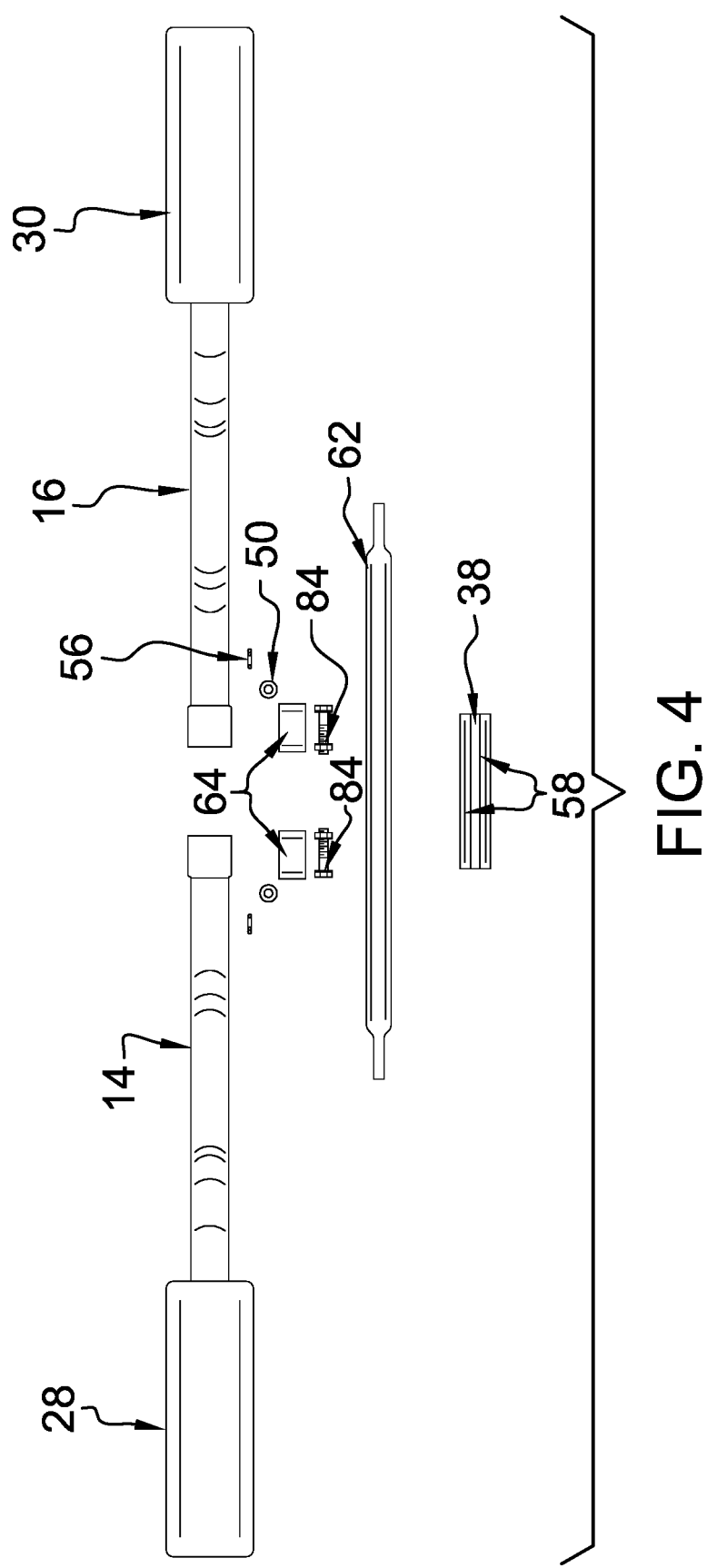
FIG. 4 is a top exploded view of an embodiment of the disclosure.
Figure 7:
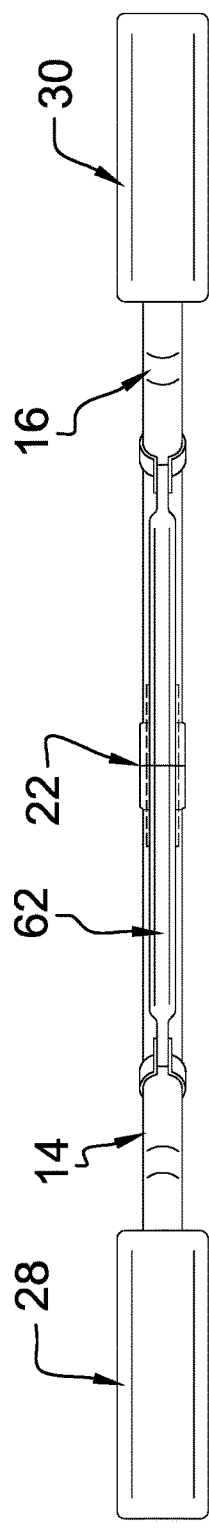
FIG. 7 is a top view of an embodiment of the disclosure.
Figure 8:
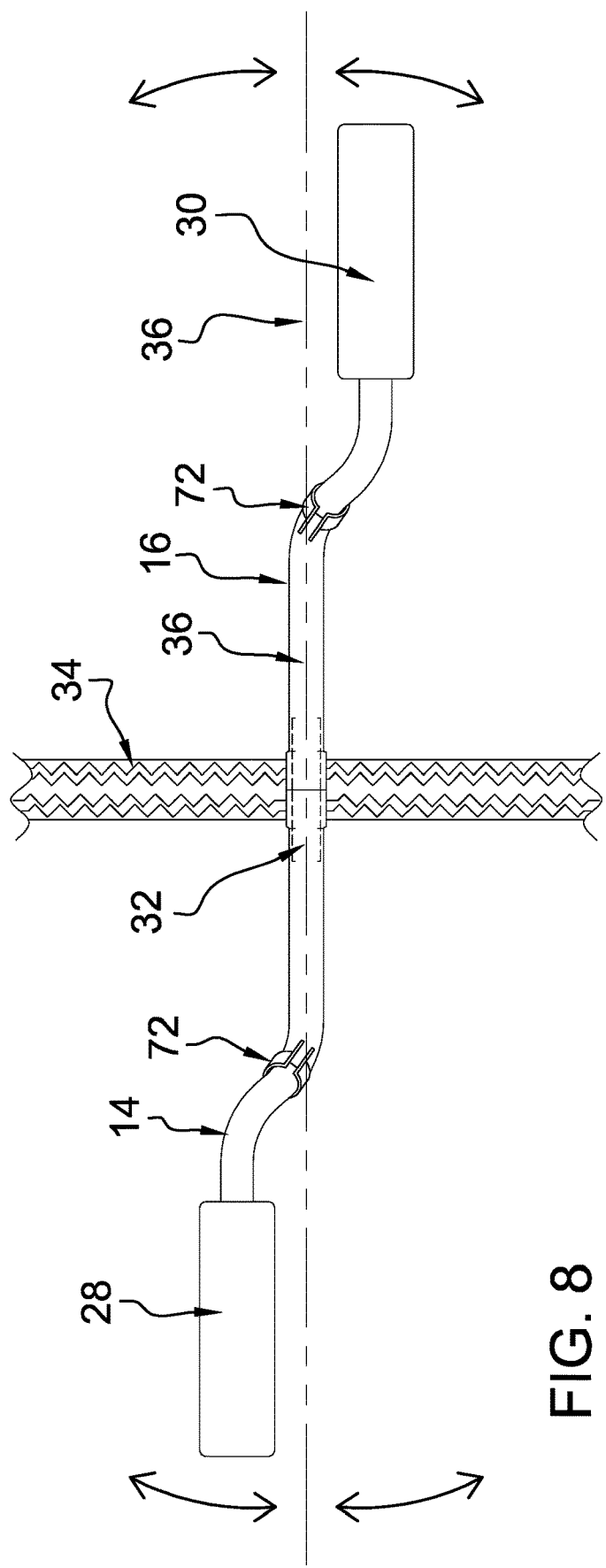
FIG. 8 is a top view of an embodiment of the disclosure.
Figure 11:
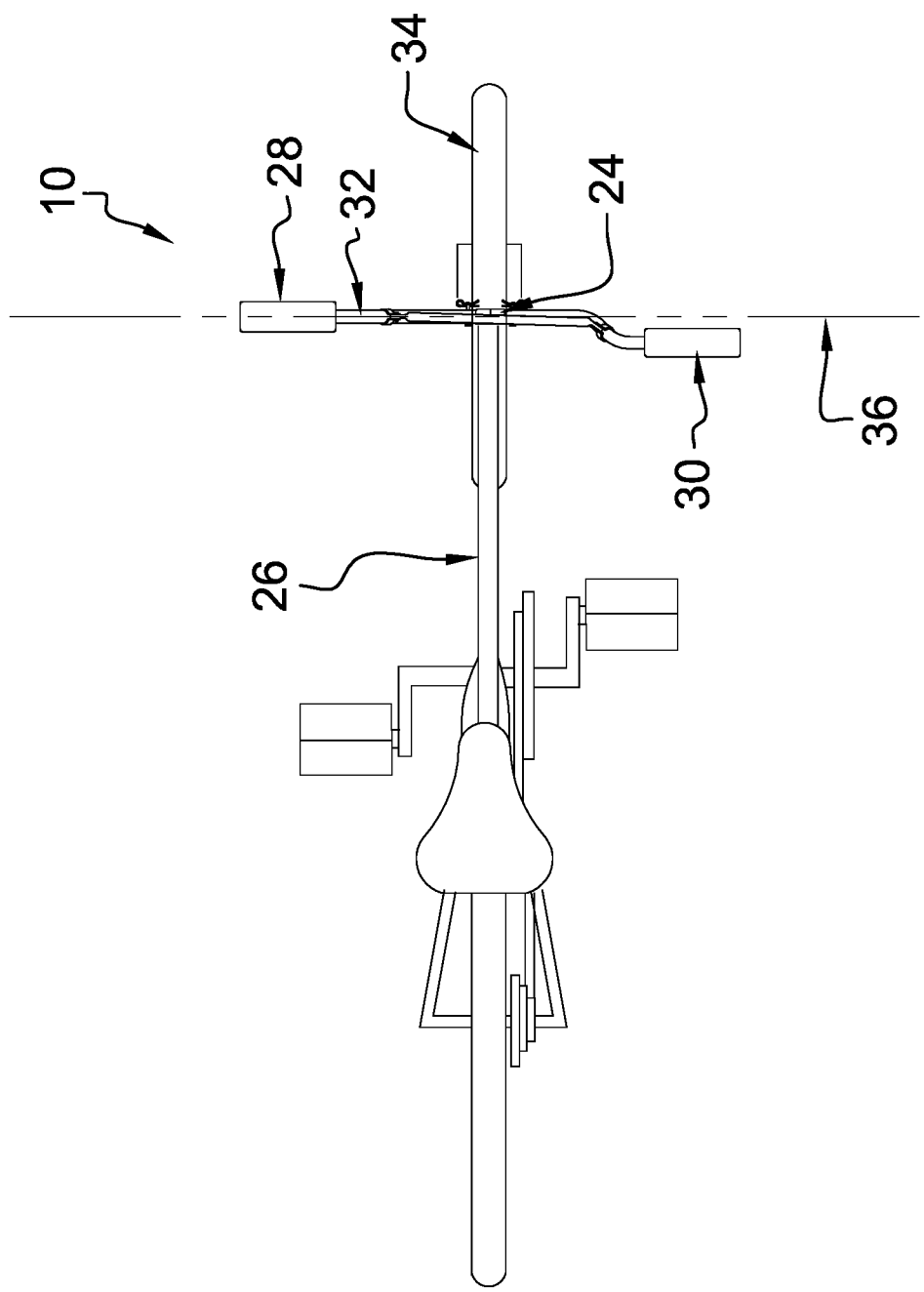
FIG. 11 is an in-use view of an embodiment of the disclosure.

With reference now to the drawings, and in particular to FIGS. 1 through 11 thereof, a new handlebar assembly embodying the principles and concepts of an embodiment of the disclosure and generally designated by the reference numeral 10 will be described.

As best illustrated in FIGS. 1 through 11, the adjustable handlebar assembly 10 generally comprises a handlebar 12, which comprises a left section 14 and a right section 16. A lower end 18 of the left section 14 and a bottom end 20 of the right section 16 are rotatably engaged and define a midpoint 22 of the handlebar 12. The handlebar 12 is configured to be mountable to a handlebar stem 24 of a bicycle 26 so that the handlebar 12 is engaged to the handlebar stem 24 at the midpoint 22. A left grip 28 and a right grip 30 of the handlebar 12 are independently positionable relative to a rotatable plane 32, which is perpendicular to a front wheel 34 of the bicycle 26 and which extends longitudinally through the handlebar stem 24.

The handlebar 12 is nonlinear so that the left grip 28 and the right grip 30 are offset from a line 36, which is positioned in the rotatable plane 32 and which extends bidirectionally from the midpoint 22. With a handlebar 12 that is linear, rotation of the left section 14 and the right section 16 would not change the position of the left grip 28 and the right grip 30 relative to the rotatable plane 32. Any configuration of handlebar 12 that is nonlinear will result in a change in position of the left grip 28 and the right grip 30 upon rotation of the left section 14 and the right section 16, respectively, relative to the rotatable plane 32.

The left section 14 and the right section 16 are selectively fixedly engageable so that the left grip 28 and the right grip 30 are fixedly positioned relative to the rotatable plane 32. The adjustable handlebar assembly 10 comprises a tube 38, which has opposed ends 40 that are open. The lower end 18 of the left section 14 is insertable over one of the opposed ends 40 and the bottom end 20 of the right section 16 is insertable over the other of the opposed ends 40, as shown in FIG. 5.

A pair of first connectors 42 is engaged singly to the left section 14 and the right section 16 proximate to the lower end 18 and the bottom end 20, respectively. A pair of second connectors 44 is engaged the tube 38. The second connectors 44 are positioned singly proximate to the opposed ends 40 of the tube 38 and are complementary to the first connectors 42. Each second connector 44 is positioned to selectively engage a respective first connector 42 so that the left section 14 and the right section 16 are fixedly positioned relative to the rotatable plane 32. With both the left section 14 and the right section 16 fastened to the tube 38, they are not rotatable relative to each other.

Each first connector 42 comprises a pair of first orifices 46, which are opposingly positioned in a respective one of the left section 14 and the right section 16. A fastening element 48 is configured for insertion through the pair of first orifices 46. The fastening element 48 may comprise a pin 50, which is insertable through the pair of first orifices 46 so that a head 52 of the pin 50 abuts the respective one of the left section 14 and the right section 16. A second orifice 54, which is positioned through the pin 50 distal from the head 52, is positioned for insertion of an R-clip 56 to retain the pin 50 in position.

The pair of second connectors 44 comprises a plurality of apertures 58, which are positioned in the tube 38 with each aperture 58 having an associated aperture 58 opposingly positioned in the tube 38. The pin 50 passes through the aperture 58 and the associated aperture 58, thus preventing rotation of the respective one of the left section 14 and the right section 16 relative to the tube 38. Each aperture 58 may comprise a slot 60, which extends from proximate to the opposed ends 40 of the tube 38.

The present invention anticipates other methods of selectively and fixedly engaging the left section 14 and the right section 16, such as, but not limited to, compression fittings, interlocking teeth, and the like.

The left section 14 and the right section 16 are configured to be selectively positioned relative to the rotatable plane 32 so that the left grip 28 and the right grip 30 are positioned to be engaged by a left hand and a right hand, respectively, of a user having a reach disparity between their arms. Reach disparities can be caused by conditions that limit extension of one arm or which cause one arm to be shorter than the other.

The adjustable handlebar assembly 10 also may comprise a bar 62, which is selectively engageable to the left section 14 and the right section 16 so that the bar 62 extends between the left section 14 and the right section 16 and stabilizes the handlebar 12 in a desired configuration, as shown in FIG. 10.

As shown in FIG. 9, each of a pair of first fasteners 64 is slidably engaged to a midsection 66 of a respective one of the left section 14 and the right section 16. The first fastener 64 is configured to engage selectively and fixedly the respective one of the left section 14 and the right section 16. A pair of second fasteners 68 is engaged singly to the bar 62 proximate to opposing ends 70 of the bar 62. Each second fastener 68 is complementary to the first fasteners 64 so that the second fastener 68 is positioned to selectively engaging a respective first fasteners 64 to engage the bar 62 to the left section 14 and the right section 16.

Each first fasteners 64 may comprise a clamp 72, which is substantially circularly shaped. The clamp 72 is selectively positionable around the midsection 66 of a respective one of the left section 14 and the right section 16. A pair of first holes 74 is positioned singly in the clamp 72 proximate to opposing endpoints 76 of the clamp 72. A fastening part 78 is selectively insertable through the pair of first holes 74 to tighten the clamp 72 onto the midsection 66 of the respective one of the left section 14 and the right section 16. The fastening part 78 may comprise a bolt 80, a nut 82, and a pair of washers 84. Each second fastener 68 comprises a second hole 86 so that the fastening part 78 passes through the second hole 86 to engage the bar 62 to the midsection 66 of the respective one of the left section 14 and the right section 16. It will be apparent to those skilled in the art of fasteners that there are a variety of fastening means that could be used to affix the bar 62 between the left section 14 and the right section 16.

In use, the tube 38 is inserted into the left section 14 and the right section 16. The midpoint 22 of the handlebar 12 then is loosely engaged to the handlebar stem 24 of the bicycle 26. The left section 14 and the right section 16 then can be rotated to adjust the left grip 28 and the right grip 30 relative to the rotatable plane 32 so that they are optimally positioned for grasping by a user having disparate arm reaches. The pins 50 and R-clips 56 are used to fix the left section 14 and the right section 16 in position, and the handlebar stem 24 then is firmly tightened onto the handlebar 12. The clamps 72 then are adjusted on the midsections of the left section 14 and the right section 16 so that the bar 62 fits between the clamps 72. The bar 62 is attached using the bolts 80, the nuts 82, and the washers 84.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An adjustable handlebar assembly comprising:
a handlebar comprising a left section and a right section, a lower end of the left section and a bottom end of the right section being rotatably engaged defining a midpoint of the handlebar, the handlebar being configured to be mountable to a handlebar stem of a bicycle, such that the handlebar is engaged to the handlebar stem at the midpoint, such that a left grip and a right grip of the handlebar are independently positionable relative to a rotatable plane perpendicular to a front wheel of the bicycle and extending longitudinally through the handlebar stem, wherein the handlebar is nonlinear, such that the left grip and the right grip are offset from a line positioned in the rotatable plane and extending bidirectionally from the midpoint;
the left section and the right section being selectively fixedly engageable, such that the left grip and the right grip are fixedly positioned relative to the rotatable plane, wherein the left section and the right section are configured for being selectively positioned relative to the rotatable plane such that the left grip and the right grip are positioned for being engaged by a left hand and a right hand, respectively, of a user having a reach disparity between their arms;
a tube having opposed ends, the opposed ends being open such that the lower end of the left section is insertable over one of the opposed ends and the bottom end of the right section is insertable over the other of the opposed ends;
a pair of first connectors engaged singly to the left section and the right section proximate to the lower end and the bottom end, respectively; and
a pair of second connectors engaged the tube and being positioned singly proximate to the opposed ends of the tube, the second connectors being complementary to the first connectors, such that each second connector is positioned for selectively engaging a respective first connector, such that the left section and the right section are fixedly positioned relative to the rotatable plane.

2. The adjustable handlebar assembly of claim 1, wherein:
each first connector comprises:
a pair of first orifices opposingly positioned in a respective one of the left section and the right section, and
a fastening element configured for insertion through the pair of first orifices; and
the pair of second connectors comprises a plurality of apertures positioned in the tube, such that each aperture has an associated aperture opposingly positioned in the tube, such that the pin passes through the aperture and the associated aperture.

3. The adjustable handlebar assembly of claim 2, wherein each aperture comprises a slot extending from proximate to the opposed ends of the tube.

4. An adjustable handlebar assembly comprising:
a handlebar comprising a left section and a right section, a lower end of the left section and a bottom end of the right section being rotatably engaged defining a midpoint of the handlebar, the handlebar being configured to be mountable to a handlebar stem of a bicycle, such that the handlebar is engaged to the handlebar stem at the midpoint, such that a left grip and a right grip of the handlebar are independently positionable relative to a rotatable plane perpendicular to a front wheel of the bicycle and extending longitudinally through the handlebar stem, wherein the handlebar is nonlinear, such that the left grip and the right grip are offset from a line positioned in the rotatable plane and extending bidirectionally from the midpoint;
the left section and the right section being selectively fixedly engageable, such that the left grip and the right grip are fixedly positioned relative to the rotatable plane, wherein the left section and the right section are configured for being selectively positioned relative to the rotatable plane such that the left grip and the right grip are positioned for being engaged by a left hand and a right hand, respectively, of a user having a reach disparity between their arms; and
a bar selectively engageable to the left section and the right section, such that the bar extends between the left section and the right section for stabilizing the handlebar in a desired configuration.

5. The adjustable handlebar assembly of claim 4, further including:
a pair of first fasteners, each first fastener being slidably engaged to a midsection of a respective one of the left section and the right section, the first fastener being configured for selectively fixedly engaging the respective one of the left section and the right section; and
a pair of second fasteners engaged singly to the bar proximate to opposing ends of the bar, each second fastener being complementary to the first fasteners, such that the second fastener is positioned for selectively engaging a respective first fastener for engaging the bar to the left section and the right section.

6. The adjustable handlebar assembly of claim 5, wherein:
each first fastener comprises:
a clamp, the clamp being substantially circularly shaped, such that the clamp is selectively positionable around the midsection of a respective one of the left section and the right section,
a pair of first holes positioned singly in the clamp proximate to opposing endpoints of the clamp, and
a fastening part selectively insertable through the pair of first holes for tightening the clamp onto the midsection of the respective one of the left section and the right section; and
each second fastener comprises a second hole, such that the fastening part passes through the second hole for engaging the bar to the midsection of the respective one of the left section and the right section.

7. The adjustable handlebar assembly of claim 6, wherein the fastening part comprises a bolt, a nut, and a pair of washers.

8. An adjustable handlebar assembly comprising:
a handlebar comprising a left section and a right section, a lower end of the left section and a bottom end of the right section being rotatably engaged defining a midpoint of the handlebar;
the handlebar being configured to be mountable to a handlebar stem of a bicycle, such that the handlebar is engaged to the handlebar stem at the midpoint, such that a left grip and a right grip of the handlebar are independently positionable relative to a rotatable plane perpendicular to a front wheel of the bicycle and extending longitudinally through the handlebar stem, the handlebar being nonlinear, such that the left grip and the right grip are offset from a line positioned in the rotatable plane and extending bidirectionally from the midpoint;

the left section and the right section being selectively fixedly engageable, such that the left grip and the right grip are fixedly positioned relative to the rotatable plane, wherein the left section and the right section are configured for being selectively positioned relative to the rotatable plane such that the left grip and the right grip are positioned for being engaged by a left hand and a right hand, respectively, of a user having a reach disparity between their arms;

a tube having opposed ends, the opposed ends being open such that the lower end of the left section is insertable over one of the opposed ends and the bottom end of the right section is insertable over the other of the opposed ends;

a pair of first connectors engaged singly to the left section and the right section proximate to the lower end and the bottom end, respectively, each first connector comprising:
- a pair of first orifices opposingly positioned in a respective one of the left section and the right section, and
- a fastening element configured for insertion through the pair of first orifices, the fastening element comprising:
  - a pin insertable through the pair of first orifices, such that a head of the pin abuts the respective one of the left section and the right section,
  - a second orifice positioned through the pin distal from the head, and
  - an R-clip selectively insertable through the second orifice;

a pair of second connectors engaged the tube and being positioned singly proximate to the opposed ends of the tube, the second connectors being complementary to the first connectors, such that each second connector is positioned for selectively engaging a respective first connector, such that the left section and the right section are fixedly positioned relative to the rotatable plane, the pair of second connectors comprising a plurality of apertures positioned in the tube, such that each aperture has an associated aperture opposingly positioned in the tube, such that the pin passes through the aperture and the associated aperture, each aperture comprising a slot extending from proximate to the opposed ends of the tube;

a bar selectively engageable to the left section and the right section, such that the bar extends between the left section and the right section for stabilizing the handlebar in a desired configuration;

a pair of first fasteners, each first fastener being slidably engaged to a midsection of a respective one of the left section and the right section, the first fastener being configured for selectively fixedly engaging the respective one of the left section and the right section, each first fastener comprising:
- a clamp, the clamp being substantially circularly shaped, such that the clamp is selectively positionable around the midsection of a respective one of the left section and the right section,
- a pair of first holes positioned singly in the clamp proximate to opposing endpoints of the clamp, and
- a fastening part selectively insertable through the pair of first holes for tightening the clamp onto the midsection of the respective one of the left section and the right section, the fastening part comprising a bolt, a nut, and a pair of washers; and a pair of second fasteners engaged singly to the bar proximate to opposing ends of the bar, each second fastener being complementary to the first fasteners, such that the second fastener is positioned for selectively engaging a respective first fastener for engaging the bar to the left section and the right section, each second fastener comprising a second hole, such that the fastening part passes through the second hole for engaging the bar to the midsection of the respective one of the left section and the right section.

* * * * *